US012333426B2

(12) United States Patent
Jiao et al.

(10) Patent No.: US 12,333,426 B2
(45) Date of Patent: Jun. 17, 2025

(54) METHOD AND APPARATUS FOR CREATING DIALOGUE, AND STORAGE MEDIUM

(71) Applicant: BEIJING BAIDU NETCOM SCIENCE AND TECHNOLOGY CO., LTD., Beijing (CN)

(72) Inventors: Zhenyu Jiao, Beijing (CN); Lei Han, Beijing (CN); Hongjie Guo, Beijing (CN); Shuqi Sun, Beijing (CN); Tingting Li, Beijing (CN); Ke Sun, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 941 days.

(21) Appl. No.: 17/302,266

(22) Filed: Apr. 29, 2021

(65) Prior Publication Data
US 2021/0248471 A1  Aug. 12, 2021

(30) Foreign Application Priority Data

Sep. 21, 2020 (CN) .......................... 202010991996.2

(51) Int. Cl.
G06F 16/35 (2025.01)
G06N 3/045 (2023.01)
G06N 3/08 (2023.01)

(52) U.S. Cl.
CPC ............... *G06N 3/08* (2013.01); *G06F 16/35* (2019.01); *G06N 3/045* (2023.01)

(58) Field of Classification Search
None
See application file for complete search history.

(56) References Cited

U.S. PATENT DOCUMENTS

| 11,861,307 B2* | 1/2024 | Asao ...................... G06F 40/58 |
| 2017/0351962 A1* | 12/2017 | Appel ...................... G06N 7/01 |
| 2019/0188295 A1* | 6/2019 | Sirotkovic .......... G06F 16/2425 |

(Continued)

FOREIGN PATENT DOCUMENTS

| CN | 109657036 A | 4/2019 |
| CN | 110134774 A | 8/2019 |
| CN | 110188864 A | 8/2019 |

(Continued)

OTHER PUBLICATIONS

Extended European Search Report for Application No. 21171957.0, dated Oct. 21, 2021, 7 pages.

(Continued)

*Primary Examiner* — Xuyang Xia
(74) *Attorney, Agent, or Firm* — Lippes Mathias LLP

(57) ABSTRACT

The present application discloses a method and an apparatus for generating a dialogue, and a storage medium. The method includes: obtaining problem information; inputting the problem information to a small sample learning model to generate a first feature; inputting the problem information to a deep learning (DL) model to generate a second feature; combining the first feature and the second feature to generate a feature sequence; and inputting the feature sequence to a fusion model to generate dialogue information corresponding to the problem information.

15 Claims, 6 Drawing Sheets

(56) References Cited

U.S. PATENT DOCUMENTS

2020/0167428 A1    5/2020  Wang et al.
2021/0034707 A1*  2/2021  Podgorny ............... G06F 40/30

FOREIGN PATENT DOCUMENTS

| CN | 110555160 A | * | 12/2019 |
| CN | 111046149 A | * | 4/2020 |
| CN | 111522965 A |   | 8/2020 |
| JP | 2018206307 A |   | 12/2018 |
| WO | 2020046807 A1 |   | 3/2020 |
| WO | 2020159890 A1 |   | 8/2020 |

OTHER PUBLICATIONS

Rohit Keshari et al., "Unravelling Small Sample Size Problems in the Deep Learning Word", Printed from the Internet, Aug. 3, 2020, 10 pages.

Ying Li et al., "Deep learning-based method coupled with small sample learning for solving partial differential equations", Multimedia Tools and Applications (2021), Jul. 8, 2020, 23 pages.

Office Action for CN application No. 202010991996.2, dated Nov. 4, 2020, 7 pages.

English translation of Office Action for CN application No. 202010991996.2, dated Nov. 4, 2020, 6 pages.

Vlasov et al., "Few-Shot Generalization Across Dialogue Tasks", 32nd Conference on Neural Information Processing Systems (NIPS 2018), Montreal, Canada, Nov. 28, 2018, 10 pages.

Ming et al., "Recent advances in neural natural language processing modeling, training, and reasoning", Engineering 2 (2016), Jan. 7, 2020, 18 pages.

English translation of Ming et al., "Recent advances in neural natural language processing modeling, training, and reasoning", Engineering 2 (2016), Jan. 7, 2020, 25 pages.

Office Action for Japanese Application No. 2021-049009, dated Jun. 7, 2022, 4 pages.

OA for KR application 10-2021-0122103 dated Jul. 5, 2024, 6 pgs.

English translation of OA for KR application 10-2021-0122103 dated Jul. 5, 2024, 8 pgs.

* cited by examiner

METHOD AND APPARATUS FOR CREATING DIALOGUE, AND STORAGE MEDIUM

CROSS-REFERENCE TO RELATED APPLICATION

The present application is based upon and claims priority to Chinese Patent Application No. 202010991996.2, filed on Sep. 21, 2020, the entirety contents of which are incorporated herein by reference.

TECHNICAL FIELD

The embodiments of the present disclosure generally relate to a field of computer technology, and particularly to a field of natural language processing (NLP) technology.

BACKGROUND

A dialogue understanding technology is a key technology of a task-based dialogue robot, configured to understand the intention of the problem input by the user. The dialogue robot's understanding of a problem depends on the intention the user may input and the corresponding sample in the corresponding scenario configured on a dialogue configuration platform.

SUMMARY

A method and an apparatus for generating a dialogue, and a medium are provided in the present disclosure.

A method for generating a dialogue is provided in embodiments of the present disclosure. The method includes: obtaining problem information; inputting the problem information to a small sample learning model to generate a first feature; inputting the problem information to a deep learning (DL) model to generate a second feature; combining the first feature and the second feature to generate a feature sequence; and inputting the feature sequence to a fusion model to generate dialogue information corresponding to the problem information.

An apparatus for generating a dialogue is provided in embodiments of the present disclosure. The apparatus includes: one or more processors; a memory storing instructions executable by the one or more processors; in which the one or more processors are configured to: obtain problem information; input the problem information to a small sample learning model to generate a first feature; input the problem information to a deep learning (DL) model to generate a second feature; combine the first feature and the second feature to generate a feature sequence; and input the feature sequence to a fusion model to generate dialogue information corresponding to the problem information.

A non-transitory computer-readable storage medium storing computer instructions is provided, in which the computer instructions are configured to cause a computer to execute a method for generating a dialogue. The method includes: obtaining problem information; inputting the problem information to a small sample learning model to generate a first feature; inputting the problem information to a deep learning (DL) model to generate a second feature; combining the first feature and the second feature to generate a feature sequence; and inputting the feature sequence to a fusion model to generate dialogue information corresponding to the problem information.

It should be understood that, the content described in the part is not intended to identify key or important features of embodiments of the present disclosure, nor intended to limit the scope of the present disclosure. Other features of the present disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

Figure 1:
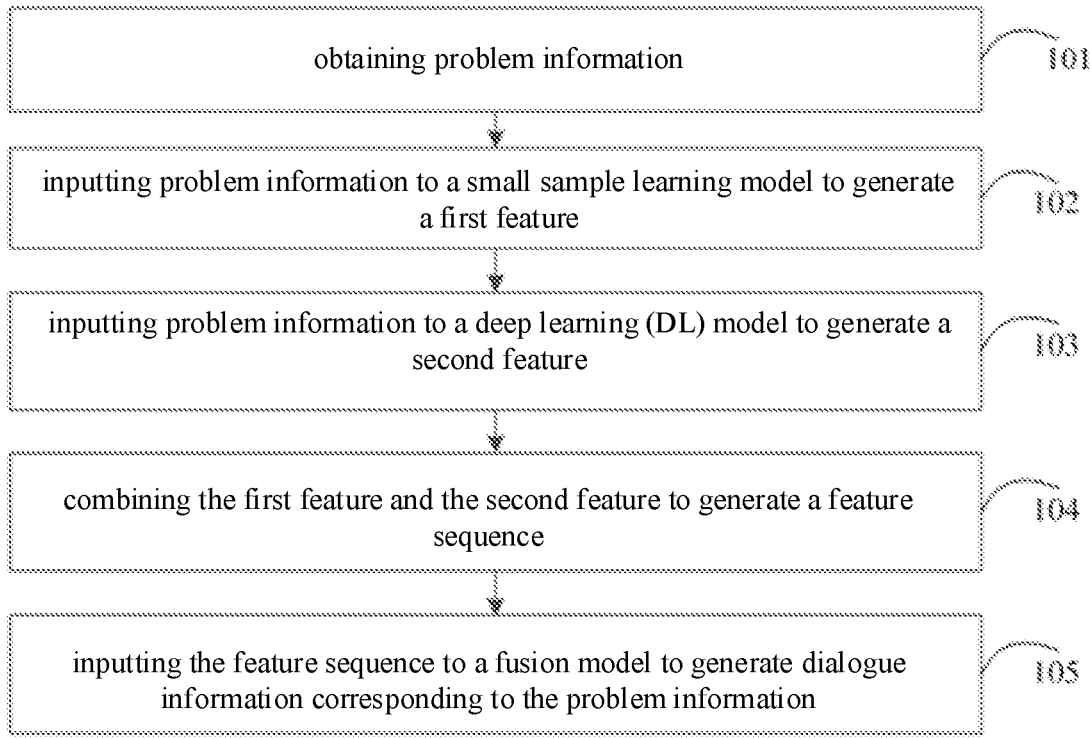
FIG. 1 is a flowchart illustrating a method for generating a dialogue according to a first embodiment of the present disclosure.

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

For the dialogue understanding problem, a deep learning (DL) model or a small sample learning model is generally adopted to predict the result corresponding to the problem input by the user. In the case of fewer samples, dialogue understanding is achieved mainly based on a small sample learning model, and in the case of more samples, dialogue understanding is achieved mainly based on a deep learning (DL) model. A small sample learning model and a DL model are mainly selected by setting a threshold based on the size of training samples.

However, artificially setting a threshold to select a small sample learning model or a DL model easily leads to reduced accuracy of problem understanding with the increase of the sample size and poor effect of the model.

A method and an apparatus for generating a dialogue, an electronic device and a medium provided in the present disclosure have the following beneficial effects.

The problem information obtained is respectively input to a small sample learning model and a deep learning (DL) model to generate a first feature and a second feature, and the first feature and the second feature are combined to generate a feature sequence, thus the feature sequence is input to a fusion model to generate dialogue information corresponding to problem information. Therefore, the small sample learning model, the DL model and the fusion model are combined to generate dialogue information corresponding to the problem, so that the model may obtain better effects in the case of fewer samples or more samples, and the small sample learning model and the DL model are selected without necessary to set a threshold, so that the accuracy of problem understanding may not be reduced with the increase of the sample size, and the stability of a model is improved.

The below refers to a method and an apparatus for generating a dialogue, an electronic device and a medium in the present disclosure as described in the accompanying drawings.

A dialogue understanding technology is a key technology of a task-based dialogue robot configured to understand the intention of the problem input by the user. The dialogue robot's understanding of a problem depends on the intention the user may input and the corresponding sample in the corresponding scenario configured on a dialogue configuration platform (example). For example, in a hotel scenario, it may exist intentions of booking a room, checkout, requesting cleaning, etc. The developer needs to configure some example descriptions for each intention, that is, a sample to train a model, so that a dialogue understanding model may correctly understand each problem input by the user. In which, the developer refers to a person who configures intentions, samples and other data on a dialogue configuration platform to acquire dialogue skills on the platform and further serve its customers with dialogue skills.

For the dialogue understanding problem, a method generally adopted is to configure a template on a dialogue management platform, and configure a large number of samples to train a DL model to classify problems input. In addition, a small number of dialogue management platforms adopt a small sample learning technology to construct a dialogue understanding operator, when one problem of the user is input to a dialogue management platform, different dialogue understanding operators produce corresponding understanding results, and the intention of the problem is obtained based on a specific rule according to the scores of different dialogue understanding operators and sample size of the training data.

However, the configuration of the template has higher requirements for the developer, and the developer needs to have a deeper understanding of scenarios and possesses a certain inductive ability, and the coverage of artificially configured templates is limited.

In addition, the effect of a DL model depends on a large number of samples, and the developer needs to label more samples, so that the model may obtain better effect. The small sample learning model may obtain better effect in the case of fewer samples, however, the effect relative to a DL model is poor when the size of samples increases. Therefore, a threshold based on the size of the training samples is generally set to determine selection priority of a small sample learning model and a DL model. When the sample size is less than a threshold, dialogue understanding is achieved mainly based on the small sample learning model; when the sample size is greater than the threshold, dialogue understanding is achieved mainly based on the DL model.

However, the optimum result may be not obtained by artificially setting a threshold to select a DL model or a small sample learning model, and model switch caused by increase of the sample size easily leads to unable to correctly understand the problems that may be correctly understood in the case of fewer samples with the increase of the sample size, and poor model effect and stability.

For the above problems, the present disclosure discloses a method for generating a dialogue. The problem information obtained is respectively input to a small sample learning model and a deep learning (DL) model to generate a first feature and a second feature, and the first feature and the second feature are combined to generate a feature sequence, thus the feature sequence is input to a fusion model to generate dialogue information corresponding to problem information, therefore, a small sample learning model, a DL model and a fusion model are combined to generate dialogue information corresponding to the problem so that the model may obtain better effects in the case of fewer samples and more samples, and a small sample learning model and a DL model are selected without necessary to set a threshold, so that the accuracy of problem understanding may not be reduced with the increase of the sample size, and the stability of a model is improved.

FIG. 1 is a flowchart illustrating a method for generating a dialogue according to a first embodiment of the present disclosure. The method may be executed by the apparatus for generating a dialogue in the present disclosure, and also may be executed by an electronic device provided in the present disclosure, in which, the electronic device may be a server, an intelligent robot, a desktop computer, a laptop, a smart phone, a wearable device, etc. The following takes an example of a method for generating a dialogue executed by an apparatus for generating a dialogue provided in the present disclosure to explain the present disclosure.

As illustrated in FIG. 1, the method for generating a dialogue may include the following blocks:

At block 101, problem information is obtained.

In the embodiment, problem information may be any problem, for example, problem information may be a problem requested by the user, for example, the user issues a problem request "去西二旗怎么走 (Chinese characters, which means that "how can I go to Xi'erqi" in English)", which is the obtained problem information. For another example, problem information further may be a problem configured to test model performance when the trained model is tested.

At block 102, the problem information is input to a small sample learning model to generate a first feature.

In the embodiment, after problem information is obtained, problem information obtained may be input to a small sample learning model to generate a first feature. A small sample learning model is a pre-training model, after the problem information is input to a small sample learning model, a small sample learning model may generate and output a first feature corresponding to the problem information according to the input problem information, for example, a problem feature corresponding to the problem information, an intention feature matching problem information, etc.

A meta-learning stage is a basic stage a small sample learning and understanding technology is provided. Meta learning, also referred to as learning to learn, refers to the learning ability of the model to quickly adapt to different tasks by training the model for a plurality of different tasks. When the model encounters a new task, it may adapt quickly and obtain better learning effects only based on a small number of data. A model produced through meta learning is referred to as a meta model, and the goal of meta learning is that a meta model focuses on the common features among different tasks and reduces reliance on task-specific features. The small sample learning model in the embodiment of the present disclosure is constructed based on meta learning and obtained after training.

The small sample learning model in the present disclosure matches the problem information input with the problem of the training sample, and endows the intention category corresponding to the problem information input according to the intention category the similar problem in the training sample belongs to, outputs the problem feature, intention feature, etc. corresponding to the problem information input, and obtains better prediction effects in the case of fewer samples.

When serving a large number of users, the dialogue management platform has also accumulated a large number of user configuration data, such as problems, intentions, word slots, logs, etc. In the embodiment of the present disclosure, skill data of a large number of user configuration data accumulated on the dialogue management platform are configured to construct learning tasks with a plurality of intention categories in numerous scenarios, and each intention may include a plurality of relevant problems, and is configured to obtain a small sample learning model through meta learning training, so that a small sample learning model may adapt to intention classification tasks in each real scenarios, and various tasks may be constantly adopted when training so that the model has better effect on all types of tasks. Moreover, the data accumulated on the dialogue management platform are configured to train a small sample learning model, which may efficiently reduce the labeling amount of the templates and reduce the workload of the developer, and the model may obtain better effect only based on fewer data labeled by the user, and be less effected by the quality of the samples labelled by the user, which is beneficial to improving the stability of the model.

At block 103, the problem information is input to a DL model to generate a second feature.

In the embodiment, after problem information is obtained, problem information may be input to a DL model to generate a second feature. The DL model is a pre-trained model, after the problem information is input to a DL model, a DL model may generate and output a second feature corresponding to the problem information according to the input problem information, for example, a second feature may be a feature vector generated by word embedding processing on problem information, a high-order feature obtained by fusion processing on a feature vector, etc.

In the embodiment, after the problem information obtained is input to a DL model, a DL model performs feature extraction, embedding and fusion on the problem information to generate and output a second feature. The specific process of generating a second feature will be given in the subsequent embodiments, which will not be described in detail herein.

It should be noted that, block 102 and block 103 are executed in no particular order, and embodiments of the present disclosure only take executing block 103 after block 102 as an example to illustrate the present disclosure, and may not be construed as a limitation of the present disclosure.

At block 104, the first feature and the second feature are combined to generate a feature sequence.

In the embodiment, after a first feature of the problem information is obtained from a small sample learning model, and a second feature of the problem information is obtained from a DL model, a first feature and a second feature may be combined to obtain a feature sequence. A single combination method may be adopted to combine the first feature and the second feature, and a plurality of different methods may also be adopted to combine the first feature and the second feature, which is not limited herein.

As an example, the combination way of the first feature and the second feature may be splicing, and the first feature and the second feature may be spliced together to obtain a spliced feature sequence. When the first feature and/or the second feature contains a plurality of features, each feature contained may be spliced with another feature to obtain a plurality of feature sequences. For example, when the first feature contains two features, and the second feature contains one feature, each feature in the first feature is spliced with the second feature to obtain two feature sequences.

As an example, different manners such as splicing and inner product may be adopted to combine the first feature and the second feature to obtain a plurality of feature sequences, so as to ensure diversity of feature sequences.

At block 105, a feature sequence is input to a fusion model to generate dialogue information corresponding to the problem information.

In the embodiment, after the feature sequence is obtained, the feature sequence is input to a fusion model to generate dialogue information corresponding to the problem information. In which, dialogue information may be intention conforming to problem information, answers that may answer problem information, etc.

For example, when the problem information is "大西二旗怎么走 (Chinese characters, which means that "how can I go to Xi'erqi" in English)", after processing of the above blocks, the fusion model may be configured to generate dialogue information corresponding to the problem information as route navigation, when the method for generating a dialogue provided in the present disclosure is applied to an electronic device with navigation softwares, the dialogue information determined is fed back to a navigation software, and the navigation software may further provide route recommendation information from the position of the user to Xi'erqi according to the dialogue information.

In the embodiment of the present disclosure, a fusion model is a pre-trained network model, and when the fusion model is trained, a cross entropy loss function may be adopted to optimize a fusion model. A fusion model may be achieved by a multilayer fully connected network, and a softmax function is configured to output the final result, and a softmax function outputs a probability the problem information belongs to each intention category, and intention category corresponding to the problem information may be determined according to magnitude of each probability, further to obtain dialogue information.

The method for generating a dialogue of the present disclosure, problem information is obtained and the problem information is input to a small sample learning model to generate a first feature, and the problem information is input to a DL model to generate a second feature, and then the first feature and the second feature are combined to generate a feature sequence and the feature sequence is input to a fusion model to generate dialogue information corresponding to problem information, therefore, a small sample learning model, a DL model and a fusion model are combined to generate dialogue information corresponding to the problem so that the model may obtain better effects in the case of fewer samples and more samples, and a small sample learning model and a DL model are selected without necessary to set a threshold, so that the accuracy of problem understanding may not be reduced with the increase of the sample size, and the stability of a model is improved.

In one possible implementation in the embodiment of the present disclosure, problem information is input to a small sample learning model, and the first feature generated and output by the small sample learning model includes a problem feature and a support set feature. A specific implementation process of generating a problem feature and a support set feature by the small sample learning model in the embodiment of the present disclosure is described in combination with FIG. 2

Figure 2:
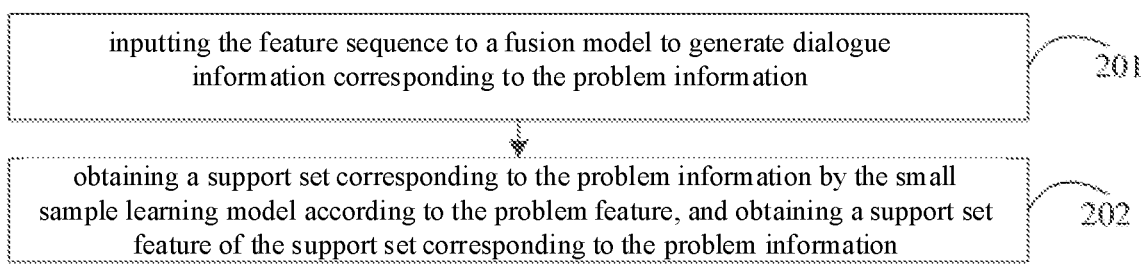
FIG. 2 is a flowchart illustrating a method for generating a dialogue according to a second embodiment of the present disclosure.

FIG. 2 is a flowchart illustrating a method for generating a dialogue according to a second embodiment of the present disclosure. As shown in FIG. 2, on the basis of the embodiment as shown in FIG. 1, block 102 may include the followings.

At block 201, a feature extraction is performed on the problem information is extracted by the small sample learning model to generate the problem feature.

In the embodiment, after the small sample learning model receives the input problem information, the feature of the problem information is extracted to generate a problem feature. The problem feature corresponds to problem information, and the feature extracted from the problem information is a problem feature.

The feature of problem information is extracted, that is, feature coding is performed on the problem information, to encode problem information into a vector with fixed length, and the vector of the fixed length is a problem feature corresponding to the problem information configured to identify problem information.

As an example, the feature of problem information is extracted, and a two-way long short-term memory (LSTM) may be adopted in combination with a self-attention mechanism to extract a problem feature, or other feature extraction networks may be further adopted to extract a problem feature, which is not limited herein.

At block 202, a support set corresponding to the problem information is obtained by the small sample learning model according to the problem feature, and the support set feature of the support set corresponding to the problem information is obtained.

In the embodiment, after the problem feature of the problem information is extracted by a small sample learning model, a support set corresponding to the problem information may be obtained according to the problem feature.

The support set is a unique concept in the small sample learning, which may be understood as training data uploaded by the developer. For example, the developer develops a function in a library scenario, which includes two intentions of borrowing a book and returning a book. The develop configures three training samples for borrowing a book, including "我想借本书 (Chinese characters, which means that "I would like to borrow a book" in English)", "我想借三国演义 (Chinese characters, which means that "I would like to borrow a book named Romance of the Three Kingdoms" in English)", and "我明天要借高等数学 (Chinese characters, which means that "I will borrow a book named Advanced Mathematics tomorrow" in English)", and configures two training samples for returning a book, including "我要还书 (Chinese characters, which means that "I would like to return the book" in English)" and "我想后天还书 (Chinese characters, which 我想后天还书 means that "I will return the book the day after tomorrow" in English)", so these two intentions configure five training samples in total that constitutes a support set in a library scenario. In the embodiment, a support set corresponding to the problem information is selected from all the support sets, for example, when the input problem information is that I would like to borrow a book, a support set corresponding to the problem information may be obtained according to the support set corresponding to the problem information, that is, three training samples contained in the intention of borrowing a book. The training samples corresponding to the intention of borrowing a book "我想借本书", "我想借三国演义" and "我明天要借高等数学" constitutes a support set 想借本书 corresponding to the problem information.

In a possible implementation of the embodiment of the present disclosure, when the small sample learning model obtains a support set corresponding to the problem information according to the problem feature, a plurality of candidate support sets are obtained first, and the intention feature of each candidate support set is obtained. A candidate support set may be determined according to the scenario corresponding to the problem information, for example, when the application scenario the problem information belongs to is a library scenario, the support set corresponding to the intention of borrowing a book and the support set corresponding to the intention of returning a book are taken as candidate support sets. For another example, when the application scenario the problem information belongs to is a hotel scenario, the support set corresponding to the intention of booking a room, the support set corresponding to the intention of checkout and the support set corresponding to the intention of requesting cleaning are taken as candidate support sets.

After a plurality of candidate support sets are obtained, the intention feature of each candidate support set may be further obtained.

As a possible implementation, the intention corresponding to each candidate support set may be represented with a vector, and the vector representation result of the intention is taken as an intention feature of the candidate support set.

As a possible implementation, the candidate support set includes a plurality of problems. The features of a plurality of problems in the candidate support set may be obtained first, and the intention feature of the candidate support set is generated according to the problem features of a plurality of problems.

In which, for each problem in the candidate support set, feature coding may be performed on each problem, for example, a two-way LSTM is adopted in combination with a self-intention mechanism to encode each problem and obtain a problem feature corresponding to each problem.

When the intention feature is generated according to problem features of a plurality of problems, for each candidate support set, an intention mechanism is adopted for a problem feature of each problem in the candidate support set through the problem feature corresponding to the problem information, to obtain an intention prototype vector based on different problem vector weights in the candidate support set. Therefore, an intention feature of the candidate support set is obtained.

For example, assume that a represents a problem feature of the input problem information, $x_i$ represents the i-th intention (that is, the i-th candidate support set), n represents sample size in the i-th candidate support set, $x_{ij}$ represents a problem feature (j=1, 2, . . . , n) corresponding to the j-th problem of the i-th candidate support set, and $x_{i\_class}$ represents an intention feature corresponding to the i-th candidate support set, the intention feature corresponding to the i-th candidate support set may be represented as:

$$x\_i\_\text{class}=(\cos(a,x\_i1)*x\_i1+\cos(a,x\_i2)*x\_i1+\ldots+\cos(a,x\_\text{in})*x\_\text{in})/n;$$

Further, in the case of more samples, in order to ensure a few samples with high similarity of the input problem information has a greater influence on the intention feature, a problem feature of the k samples with the maximum similarity may be selected to represent an intention feature, that is:

$$x\_i\_\text{class}=(t\_1*\cos(a,x\_i1)*x\_i1+\ldots+t\_n*\cos(a,x\_\text{in})*x\_\text{in})/k;$$

where, k values with the maximum cosine value in $t\_1 \sim t\_n$ are 1 and the remaining are 0, therefore, a problem sample with the maximum similarity among problem features of the problem information has a greater influence on the intention feature.

In the embodiment, problem features of a plurality of problems in the candidate support set may be obtained, and the intention feature of the candidate support set is generated according to the problem features of a plurality of problems. Thus, feature representation of the intention corresponding to the candidate support set may be achieved, and the intention feature is obtained by weighting based on different problem features in the candidate support set so that a small sample learning model may obtain different feature features for the different input problem information.

According to the implementation process of obtaining an intention feature of the candidate support set recorded above, the intention feature of each candidate support set may be obtained, further a small sample learning model generates a direct score of a plurality of candidate support sets relative to the problem feature corresponding to the problem information according to the problem feature corresponding to the problem information and the intention feature of each candidate support set, and a support set corresponding to the problem information is selected according to the direct score of a plurality of candidate support sets relative to the problem feature corresponding to the problem information.

As an example, when a direct score of the problem feature corresponding to the problem information relative to a plurality of candidate support sets is generated, the problem feature corresponding to the problem information may be spliced respectively with the intention feature corresponding to each candidate support set, and then processed through two fully connected layers, and then output a score between 0~1 by a sigmoid function, that is, a direct score. The intention feature corresponding to each candidate support set is performed through the above process, to obtain a direct score of different candidate support sets the input question information belongs to. The direct score is configured to represent the ideogram of the score, which represents the confidence coefficient in the correct classification. According to the direct score of the problem feature corresponding to the problem information relative to a plurality of candidate support sets, a support set corresponding to the problem information may be selected from a plurality of candidate support sets. For example, the candidate support set with the highest direct score may be selected as a support set corresponding to the problem information.

In the embodiment, the intention feature of each candidate support set is obtained by obtaining a plurality of candidate support sets, thus the direct score of the problem feature relative to a plurality of candidate support sets may be generated according to the problem feature corresponding to the problem information and the intention feature of each candidate support set, and then a support set corresponding to the problem information is selected according to the direct score, therefore, a support set that best matches the problem information may be selected according to a plurality of candidate support sets, to improve the accuracy of selecting a support set and provide conditions for subsequently understanding problem information accurately.

Further, in a possible implementation in the embodiment of the present disclosure, a small sample learning model may further generate a contextual feature among a plurality of candidate support sets according to the intention feature of each candidate support set, thus a comparison score is generated according to the problem feature corresponding to the problem information, the intention feature of each candidate support set and the contextual feature, and a support set corresponding to the problem information is selected from a plurality of candidate support sets according to the direct score and the comparison score.

The intentions corresponding to different candidate support sets are different. In the embodiment, a contextual feature among a plurality of candidate intention features is generated according to the intention feature of each candidate support set, so that the intention feature of each candidate support set may obtain an intention feature of other candidate support sets, which helps improve the differentiation among different intentions. In specific implementation, a two-way LSTM may be adopted to regard the intention feature of each candidate support set as an element in a sequence, and a set to set framework may be adopted to model a context. The sequence is input to the two-way LSTM, and output from the two-way LSTM to obtain a contextual feature containing a context.

Then, a comparison score may be generated according to the problem feature, the intention feature of each candidate support set and the contextual feature.

As an example, for each candidate support set, after the problem feature corresponding to problem information, the intention feature of the candidate support set and the contextual feature are spliced, a score is output through a fully connected layer, and then according to the score corresponding to the real intention of the problem information and the above score, a comparison score is obtained by a sigmoid function and a cross entropy loss function.

For example, assume that the real intention of the input problem information a is an intention 3, that is, a support set corresponding to the problem information a should be a support set corresponding to an intention 3. After the problem feature of a, the intention feature of a support set 1 (corresponding to intention 1) and the contextual feature are spliced, the output score is denoted as s1 through two fully connected layers. Similarly, a score may be obtained for the intention of each candidate support set such as intention 2, intention 3, etc., denoted as s2, s3, etc. A probability of s3>s1 may be represented by sigmoid (s3−s1). Similarly, a probability of s3>s2, a probability of s3>s4, etc. may be calculated, and then a loss may be obtained by a cross entropy loss function to obtain a comparison score.

The comparison score means a score of the problem information belonging to a candidate support set A greater than belonging to a candidate support set B, to ensure the accuracy of classification, and a direct score is configured to represent a confidence coefficient of correct classification. Therefore, in the embodiment, according to the comparison score and the direct score, a support set corresponding to the problem information may be selected from a plurality of candidate support sets.

In the embodiment, a contextual feature among a plurality of candidate intention features is generated according to the intention feature of each candidate support set, so that the intention feature of each candidate support set may obtain information of the intention feature of other candidate support sets, which helps improve the differentiation among different intentions; a comparison score may be generated according to the problem feature, the intention feature of each candidate support set and the contextual feature, and a support set corresponding to the problem information may be selected according to the direct score and the comparison score, to ensure the accuracy of selecting a support set.

After a support set corresponding to the problem information is obtained, the feature of the support set corresponding to each candidate support set may be further obtained. For example, the above intention feature may be taken as a support set feature, that is, a support set feature of the support set may be obtained by the attention mechanism of the problem feature of each problem in the support set.

In the method for generating a dialogue in the embodiment, the problem feature is generated by extracting the feature of the problem information, and the support set corresponding to the problem information is obtained according to the problem feature, and then the support set feature of the support set corresponding to the problem information is obtained. Therefore, the feature of the problem information may be extracted by a small sample learning model, which provides conditions for subsequent problem understanding based on the extracted feature.

Figure 3:
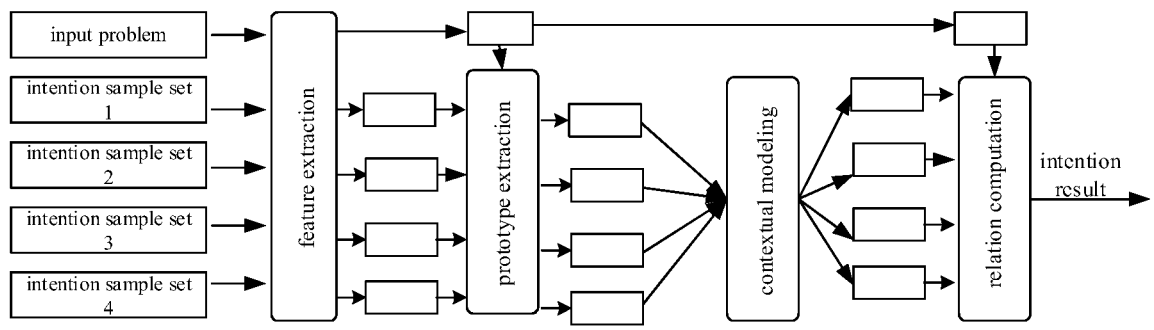
FIG. 3 is a schematic diagram illustrating a structure of a small sample learning model in the embodiment of the present disclosure.

FIG. 3 is a schematic diagram illustrating a structure of a small sample learning model in the embodiment of the present disclosure. As illustrated in FIG. 3, the small sample learning model mainly includes four parts, that is, a feature extraction (coding) part, a prototype extraction part, a context modeling part and a relation computation part. The main function of a feature extraction part is to perform feature coding on each question of each intention in the support set and the requested problem information, and each problem is coded into a fixed-length vector, and a fixed-length vector is configured to identify the corresponding problem. The specific method adopted may be a two-way LSTM with a self-attention mechanism, and also may be some other feature extraction structures, such as a transformer structure. In the prototype extraction part, each intention in the support set is represented by a vector, to obtain an intention vector corresponding to each intention. Specifically, an attention mechanism may be adopted for each question in the intention through the requested problem information, to obtain an intention feature based on the problem features of different problems in the intention. Therefore, for each different requested problem, a different intention feature may be obtained, and the intention vector may be regarded as a side silhouette of the intention prototype in the hidden space, which is configured to better respond to a requested problem. It needs to be noted that, in the case of more samples, the attention mechanism may focus on the partial problem in the support set, so that the intention feature of each intention generated is more representative. Since the support set contains a plurality of different intentions, therefore, the intention feature of each intention may obtain information of other intentions, similar to a context of the article, thereby helping improve the differentiation of different intentions. In the contextual modeling part, each intention feature may be taken as an element of the sequence, and the sequence is input to a two-way LSTM and output from a two-way LSTM, to obtain a contextual feature of each intention containing other intention features. In the relation calculation part, it is calculated which candidate intention the request question belongs to (or none of them). The part contains a multi-task learning scheme, including a direct score of a direct problem belonging to a certain intention and a comparison score of the problem belonging to A intention being greater than the problem belonging to B intention. The comparison score is configured to ensure the accuracy of classification, and the direct score is configured to ensure the ideogram of the score, and the direct score represents the model's confidence in the correct classification. Therefore, it may be determined which intention the request problem belongs to based on the direct score and the comparison score.

In a real dialogue scenario, different skills configured by the developer contain different intentions, and the number of samples with the same skill and different intentions is also different. A large number of real user skills and real data configured by users under the skills may be obtained through a dialogue management platform, which also truly reflect the large changes in the number of intentions and samples in different scenarios. By making full use of these data, a small sample learning model of the embodiment of the present disclosure achieves that the same meta-learning model is configured to solve complex and diverse scenarios, which ensures stability of the effects in a plurality of different scenarios. When the users configure specific skills, simple fine-tuning or even no fine-tuning is made on the meta-learning model to achieve better results. By making full use of the data accumulation advantages of the dialogue management platform, in the case of fewer samples, the intention of the new problem may be inferred through the similarity between the new problem and the known training sample, which improves the availability of the model.

In one possible implementation in the embodiment of the present disclosure, problem information is input to a DL model, and the second feature generated and output by the DL model includes a high-order feature and a low-order feature. A specific implementation process of generating a high-order feature and a low-order feature by the DL model in the embodiment of the present disclosure is described in combination with FIG. 4.

Figure 4:
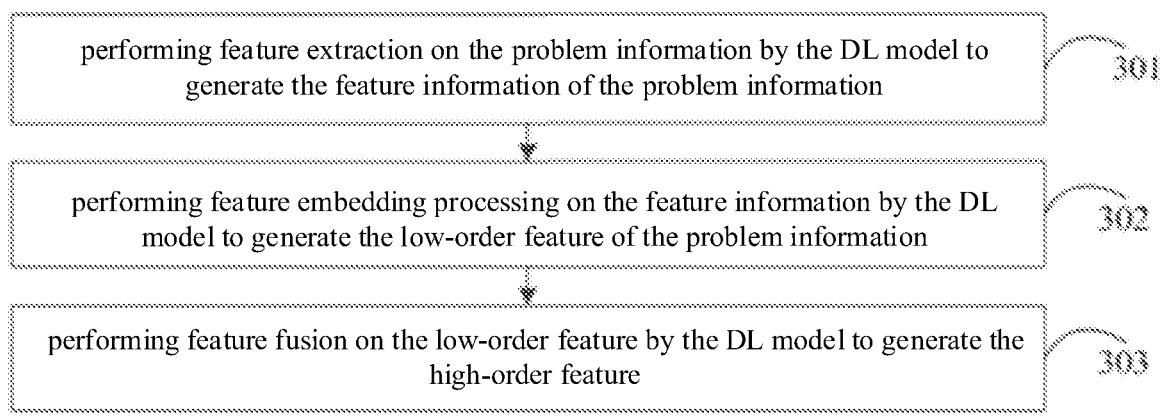
FIG. 4 is a flowchart illustrating a method for generating a dialogue according to a third embodiment of the present disclosure.

FIG. 4 is a flowchart illustrating a method for generating a dialogue according to a third embodiment of the present disclosure. As illustrated in FIG. 4, on the basis of the embodiment as shown in FIG. 1, block 103 may include the followings.

At block 301, a feature extraction is performed on the problem information by the DL model to generate feature information of the problem information.

In the embodiment, a DL model may extract problem information, which may be a word segmentation result, a part of speech result, a named entity contained of the problem information, etc.

As an example, a DL model may embed a lexical analysis tool, which is configured to extract the feature of the input problem information, to obtain a word segmentation result, a part of speech result, a named entity contained of the problem information, etc.

A lexical analysis tool may be trained and obtained by using a large number of data accumulated on the dialogue management platform as well as other big data platforms, which may be trained through a large number of data so that it possesses an excellent feature extraction capability, so as to help a DL model achieve better results even when the samples configured by the users are fewer or biased.

At block 302, feature embedding processing is performed on the feature information by the DL model to generate a low-order feature of the problem information.

In the embodiment, feature embedding processing may be performed to transform the feature information extracted into a form a neural network may deal with, to form features after embedding. Since the feature is close to an input layer of a deep neural network, it may be referred to as a low-order feature, also called a low-dimension feature.

The method of feature embedding processing may be achieved by adopting a relatively mature embedding model, for example, each feature information is mapped to a vector through a dictionary to obtain a low-order feature of the problem information. The specific implementation of feature embedding processing in the present disclosure is not limited.

At block 303, feature fusion is performed on the low-order feature by the DL model to generate a high-order feature.

In the embodiment, after the low-order feature of the problem information is obtained, feature fusion may be performed on the low-order feature, to obtain a high-order feature of the problem information. The high-order feature refers to a feature close to the final output layer, for example, a feature output by a fully-connected layer is obtained as a high-order feature.

As an example, after the low-order feature of the problem information is obtained, each low-order feature obtained may be spliced, to obtain a long feature vector, and the long feature vector obtains a high-order feature corresponding to the problem information through a two-way LSTM and max pooling.

In the method for generating a dialogue in the embodiment, the feature of the problem information is extracted by a DL model to generate feature information of the problem information, and then feature embedding processing is performed on the feature information to generate a low-order feature of the problem information, and feature fusion is performed on the low-order feature to generate a high-order feature. Therefore, the feature of the problem information may be extracted from a DL model, which provides conditions for subsequent problem understanding based on the extracted feature.

Further, in a possible implementation of the embodiment of the present disclosure, the DL model further receives an external feature vector of the problem information, in which the external feature vector is generated by a preset vector representation model, and the preset external feature vector may be an Enhanced Representation from kNowledge IntEgration (ERNIE), and also may be other word vector pre-training models, which will not be limited here. The problem information obtained is input to a word vector pre-training model of ERNIE, etc., to obtain a corresponding vector representation, and the vector representation is denoted as the external feature vector of the problem information. Thus, feature fusion is performed on the low-order feature and the external feature vector by the DL model to generate a high-order feature. After a low-order feature and an external feature vector may be spliced, the spliced vector obtains a high-order feature through a two-way LSTM and max pooling.

Therefore, an external feature vector of the problem information is received, and feature fusion is performed on the low-order feature and the external feature vector to generate a high-order feature so that a DL model takes feature information of the problem information itself and an external feature vector of the problem information generated by other models into consideration when generating a high-order feature of the problem information, which helps improve the accuracy extracted by a high-order feature so that the high-order feature extracted may accurately identify problem information.

In a possible implementation in the embodiment of the present disclosure, a DL model further receives an external knowledge vector of the problem information, in which the external knowledge vector is a vector representation corresponding to a target training sample matching the problem information in a preset training sample. For example, a relationship between a sample in training data and a slot position is statistically analyzed, when the word slot contained in the problem input when testing satisfies the corresponding condition, the possible intention distribution of the sample is also taken as an input to a model. For the convenience of understanding an extraction process of the external knowledge vector, extraction of external knowledge vector is introduced in detail and illustrated.

A necessary word slot, a secondary word slot and minimum slot are extracted from the training sample, in which, a necessary word slot is defined as a slot that must appear in the dialogue sample of the intention; a secondary word slot is defined as a slot that has appeared but not necessarily appears in the dialogue sample of the intention; the minimum slot coverage ratio is defined as the minimum ratio of the length of the slot portion to the entire sample length in the sample of the intention.

After the above three information are extracted from the training sample for each intention, when a new dialogue sample is predicted, it is judged whether to satisfy the intention according to information. First, training set vocabulary matching and entity recognition results are adopted to examine whether necessary slots of the intention in all possible slots contained in the new sample are contained in the new sample. If necessary slots are contained, all other possible secondary word slots in the sample are denoted. Finally, examine whether the slot coverage ratio is greater than or equal to the minimum slot coverage ratio of the intention. If so, it satisfies the intention, or vice versa. All the satisfied intentions are the intention candidate knowledge of the new sample contained. In order to combine knowledge and a model, the intention candidate knowledge is transformed to a vector with value as 1 and 0 with the same number of dimensions and classification intentions, in which each dimension of the vector corresponds to one intention and the value of each dimension of the vector is 0 or 1. When the intention appears in the intention candidate knowledge, the corresponding dimension is 1 or 0, and the vector is an external knowledge vector.

The above process is illustrated as below.

Assume that there are four denoted training samples as below, in which, the first item is a dialogue sample, the second is an intention, the latter is a slot, ROUTE is a route querying intention, TRAFFIC is a traffic inquiry intention, user_navi is a navigation slot, kw_go is a slot representing "去 (Chinese character, which means go in English)", user_route_arrival is a slot of a destination, kw_traffic is a slot of traffic key words, and user_travel_type is a slot of travel type.

Training sample 1: 导航去西二旗 (Chinese characters, which means that "navigate to Xi'erqi" in English) ROUTE user_navi:导航 (Chinese characters, which means navigate in English) kw_go:去 (Chinese characters, which means to in English) user_route_arrival: 西二旗 (Chinese characters, which means Xi'erqi in English);

Training sample 2: 我要驾车去西二旗的路线 (Chinese characters, which means that "I need a driving route to Xi'erqi" in English) ROUTE kw_go:去 (Chinese characters, which means to in English) user_route_arrival: 西二旗 (Chinese characters, which means Xi'erqi in English) user_travel_type:驾车 (Chinese characters, which means driving in English);

Training sample 3: 导航去西二旗堵吗 (Chinese characters, which means that "Is there a traffic jam when navigating to Xi'erqi" in English) TRAFFIC user_navi: 导航 (Chinese characters, which means navigate in English) kw_go:去 (Chinese characters, which means to in English) user_route_arrival:西二旗 (Chinese characters, which means Xi'erqi in English) kw_traffic: 堵吗 (Chinese characters, which means that "Is there a traffic jam" in English);

Training sample 4: 前方路况 (Chinese characters, which means "condition of roads ahead" in English) TRAFFIC kw_traffic:路况 (Chinese characters, which means "condition of roads" in English).

From the above four samples, necessary slots of ROUTE intention are kw_go and user_route_arrival, secondary slots are user_navi and user_travel_type, a necessary slot of TRAFFIC intention is kw_traffic (condition of roads), and secondary slots are user_navi, kw_go and user_route_arrival. Slot coverage ratios of two samples corresponding to a ROUTE intention are respectively 100% and 54.5%, therefore, the minimum slot coverage ratio of ROUTE is 54.5%; the slot coverage ratios of two samples corresponding to a TRAFFIC intention are respectively 100% and 50%, therefore, the minimum slot coverage ratio of TRAFFIC is 50%. At the same time, slot word lists that may be counted are user_navi: {导航 (navigate)}, kw_go:{去 (to)}, user_route_arrival: {西二旗 (Xi'erqi)}, kw_traffic: {路况 (condition of roads), 堵吗 (Is there a traffic jam)}.

When a new prediction sample is "导航去西二旗怎么 走 (Chinese characters, which means that "how can I navigate to Xi'erqi" in English)", all possible slots are matched through a slot word list: user_navi:导航 (navigate), kw_go: 去 (to), user_route_arrival:西二旗 (Xi'erqi). Necessary slots containing ROUTE in the slot are kw_go and user_route _arrival, user_navi is a secondary slot of ROUTE, a slot coverage ratio is 6/9=66.7%, the minimum coverage ratio greater than ROUTE is 54.5%, and the prediction sample satisfies the intention ROUTE. The slot doesn't contain the necessary slot kw_traffic, therefore, the prediction sample doesn't satisfy the intention ROUTE. Finally, the intention candidate knowledge obtained is {ROUTE}, excluding the wrong candidate of TRAFFIC. Assume that the total intentions only contain ROUTE and TRAFFIC, the first dimension represents ROUTE, and the second dimension represents RAFFIC, the output vector is {1, 0}, that is, the external knowledge vector corresponding to the problem "导航去西二旗怎么 走 (Chinese characters, which means that "how can I navigate to Xi'erqi" in English)" is {1, 0}.

Thus, after the DL model receives an external knowledge vector, feature fusion may be performed on the low-order feature, the external knowledge vector and the external feature vector to generate the high-order feature. After the low-order feature, the external knowledge vector and the external feature vector may be spliced, the spliced vector obtains a high-order feature through a two-way LSTM and max pooling.

Therefore, an external knowledge vector of the problem information is received through a DL model, and feature fusion is performed on the low-order feature, the external knowledge vector and the external feature vector to generate a high-order feature so that a DL model takes feature information of the problem information itself, an external feature vector input by the external model and an external knowledge vector obtained through statistics into consideration when generating a high-order feature of the problem information, which helps improve the accuracy extracted by a high-order feature so that the high-order feature extracted may accurately identify problem information.

Figure 5:
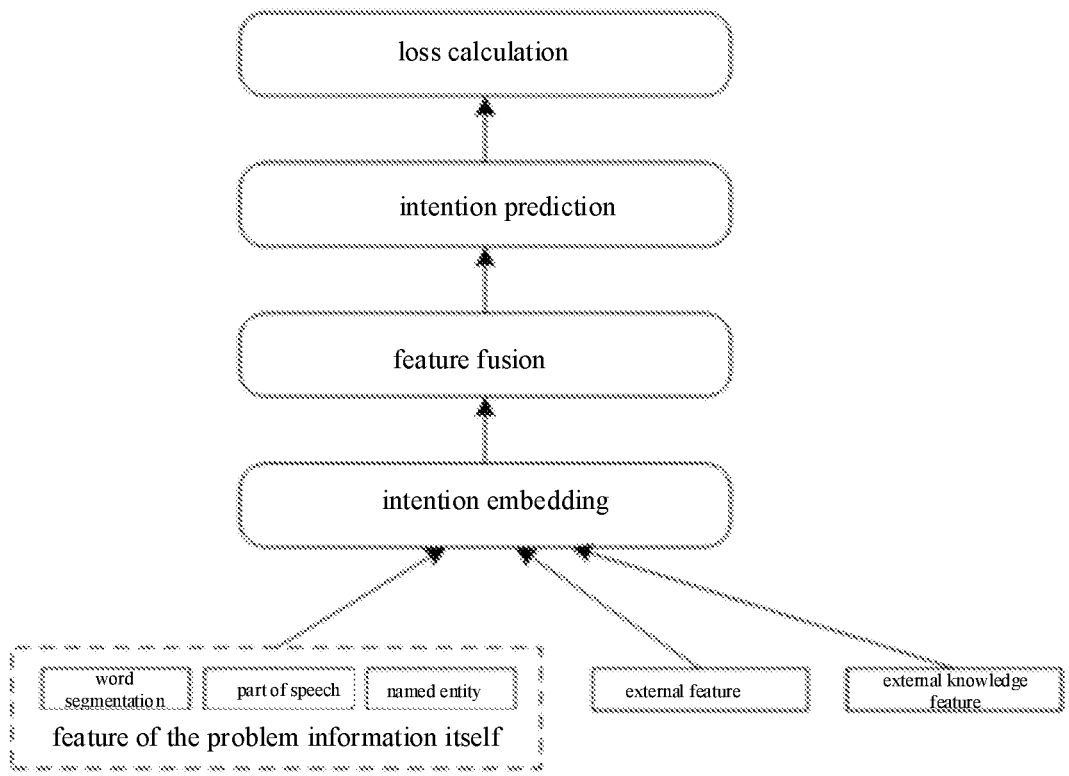
FIG. 5 is a schematic diagram illustrating a structure of a deep learning (DL) model in the embodiment of the present disclosure.

FIG. 5 is a schematic diagram illustrating a structure of a deep learning (DL) model in the embodiment of the present disclosure. As illustrated in FIG. 5, the DL model includes feature extraction, feature embedding, feature fusion, intention prediction and loss calculation. In the feature extraction part, the features of the problem information itself are included, for example, a word segmentation result, a part of speech result, a named entity contained of the problem information, etc. the features of the problem information itself may be extracted through a lexical analysis tool, and some other external features, for example, the features of the problem information obtained from the current popular pre-training model (for example, ERNIE), some external knowledge features, for example, some statistics knowledge extracted from the training sample, are further extracted from it, in which, the external knowledge features are obtained referring to descriptions of the above relevant contents, which will not be repeated here. Based on a large number of data accumulated on the dialogue management platform as well as other big data platforms, a lexical analysis tool and a pre-training model are fully trained so that it possesses an excellent basic feature extraction capability, so as to help a DL model achieve better results even when the samples configured by the users are few or biased. In the feature embedding part, feature embedding processing is performed on the features extracted by the feature extraction part, to transform the feature in a vector representation form the network model may deal with, and for the features output by the pre-training model and the external knowledge feature obtained, since they themselves are features represented by a vector, no further processing is performed on the feature embedding part. In the feature fusion part, each feature represented by a vector is fused to fully combine various features to form a high-order feature, for example, features represented by each vector may be spliced to obtain a long vector, and the long vector obtains a high-order feature through a two-way LSTM and max pooling. In the intention prediction part, on the basis of the fused high-order feature, a probability of the problem information on each intention is obtained, for example, the high-order feature obtains a vector through a fully connected layer, and the dimension of the vector is equal to the number of intentions, and logistic function sigmoid is performed on each dimension of the vector, to obtain the probability of each intention. In the loss calculation part, losses need to be calculated constantly according to the gap between the current prediction results of the problem and the real result of the problem, and a model is constantly optimized according to a Back Propagation (BP) algorithm, to finally complete a training process of the model. For extraction and modeling of features, a DL model may fully utilize different samples to effectively build model categories in the case of more samples, so as to achieve better differentiation accuracy. A basic feature extraction model trained through data accumulation of the dialogue management platform and other big data may ensure the stability of the effect, so as to obtain good effect in the case of a small specific skill model.

In order to ensure the first feature and the second feature fully combined and improve the overall performance of the model, in a possible implementation of the embodiment of the present disclosure, a plurality of ways may be adopted to combine the first feature and the second feature to generate a feature sequence. A detailed description will be given below in combination with FIG. 6.

Figure 6:
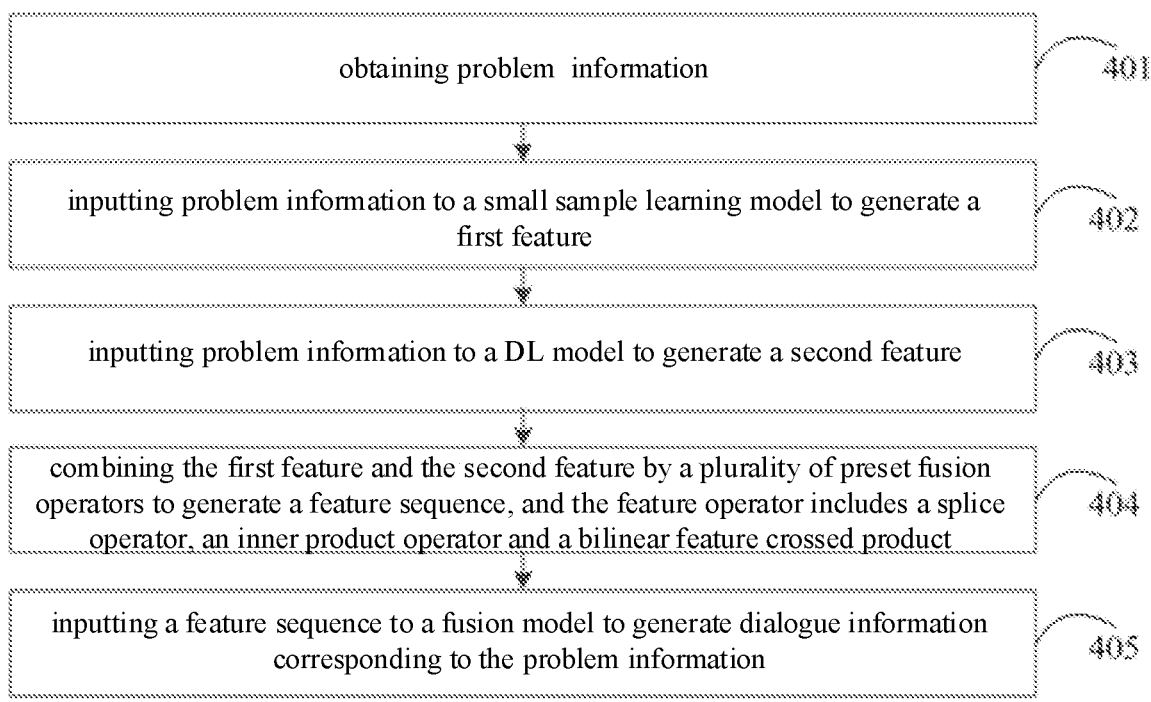
FIG. 6 is a flowchart illustrating a method for generating a dialogue according to a fourth embodiment of the present disclosure.

FIG. 6 is a flowchart illustrating a method for generating a dialogue according to a fourth embodiment of the present disclosure. As shown in FIG. 6, the method for generating a dialogue may include the followings.

At block 401, problem information is obtained.

At block 402, the problem information is input to a small sample learning model to generate a first feature.

At block 403, the problem information is input to a DL model to generate a second feature.

In the embodiment, the descriptions of blocks 401 to 403 may refer to the relevant records in the above embodiments, which will not be repeated here.

At block 404, the first feature and the second feature are combined by using a plurality of preset fusion operators to generate a feature sequence, and the feature operators include a splice operator, an inner product operator and a bilinear feature crossed product.

In the embodiment, after a first feature is obtained from a small sample learning model, and a second feature is obtained from a DL model, a first feature and a second feature may be combined to generate a feature sequence.

The fusion operator may include but not limited to a splice operator, an inner product operator and a bilinear feature crossed product.

That is, in the embodiment, when the first feature and the second feature are combined, a plurality of different fusion operators may be adopted to respectively combine the first feature and the second feature, to ensure a combination of different features and improve the diversity of combined features.

As an example, when the first feature includes a problem feature and a support set feature, and the second feature includes a high-order feature and a low-order feature, for the combination of a high-order feature and a low-order feature, each feature may be combined successively by adopting different fusion operators, to obtain a plurality of feature sequences. Taking a problem feature as an example, a splice operator, an inner product operator and a bilinear feature crossed product may be respectively adopted, to combine the problem feature with at least one of the problem feature, the support set feature, the low-order feature, and the high-order feature successively, to obtain a plurality of feature sequences.

As an example, when the first feature generated by a small sample learning model and the second feature generated by a DL model are combined from different layers, to generate a feature sequence. Fusion in different layers are as follow:

(1) a low-level feature level, that is, the feature representation embedded in the DL model and the problem feature representation and category representation obtained in the small sample learning model are fused through a plurality of preset fusion operators;

(2) a middle-level feature level, that is, the feature representation embedded in the DL model and the representation through relationship calculation in the small sample learning model are fused through a plurality of preset fusion operators;

(3) a high-level feature level, a probability of each intention finally predicted by the DL model and the probability distribution of each intention finally predicted by the small sample learning model are fused through a plurality of preset fusion operators.

At block 405, a feature sequence is input to a fusion model to generate the dialogue information corresponding to the problem information.

In the embodiment, the descriptions of block 405 may refer to the descriptions of block 105 in the above embodiments, which will not be repeated here.

The method for generating a dialogue of the present disclosure, a first feature generated by a small sample learning model and a second feature generated by a DL model are combined by a plurality of preset fusion operators to generate a feature sequence, so that the first feature and the second feature are fully combined to ensure the diversity of the fused feature sequence, thus helping improve the accuracy of dialogue information generated.

In a possible implementation of the embodiment of the present disclosure, the small sample learning model, the DL model and the fusion model are obtained through joint training. In specific implementation, overall learning and training are performed on a small sample learning model and a DL model in the same end-to-end fusion network so that a model may obtain a relatively stable result with the increase of samples, and the accuracy of problem understanding may not be reduced with the increase of the sample size due to unable to correctly parse the intention that might be correctly parsed, and at the same time, joint learning is performed on three models to obtain an overall model so that a single model may obtain better effect in the case of fewer samples and more samples, so as to enhance the stability of the model. Therefore, in the embodiment, the small sample learning model, the DL model and the fusion model are obtained through joint training, so that the model after training obtains a relatively stable result with the increase of number of samples and enhance the stability of the model.

Figure 7:
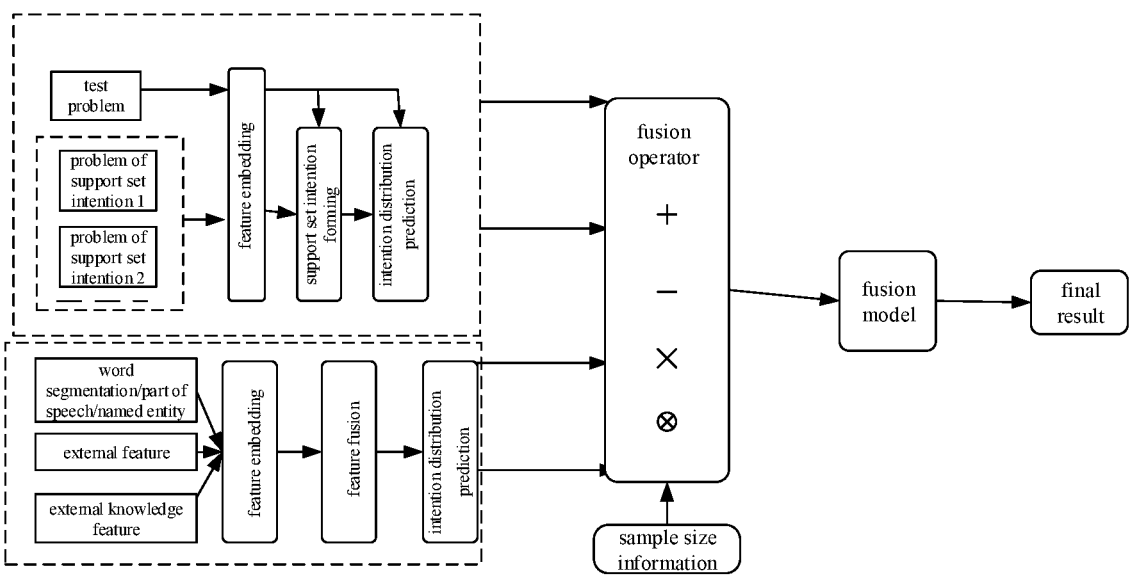
FIG. 7 is a diagram illustrating a process of joint training of a small sample learning model, a DL model and a fusion model.

FIG. 7 is a diagram illustrating a process of joint training of a small sample learning model, a DL model and a fusion model. As illustrated in FIG. 7, overall learning and training are performed on a small sample learning model and a DL model in the same end-to-end convergence network, and problem features and support set features produced by a small sample learning model and low-order features and high-order features produced by a DL model are fully fused through a plurality of fusion operators, and the fused features are input to a fusion network to obtain the final result. The fusion network may be achieved by a multi-layer fully connected layer network, and with a softmax function, the final result is obtained. During joint training process of the model, a model may be optimized by a cross-entropy loss function until the model may obtain better result. Overall learning and training are performed on a small sample learning model, a DL model and a fusion model so that the effect of a model may be gradually enhanced with the increase of samples, and the accuracy of problem understanding may not be reduced with the increase of the sample size due to unable to correctly parse the intention that might be correctly parsed, and at the same time, a single model may obtain better effect in the case of fewer samples and more samples so as to enhance the stability of the model.

According to the embodiment of the present disclosure, an apparatus for generating a dialogue is further provided.

Figure 8:
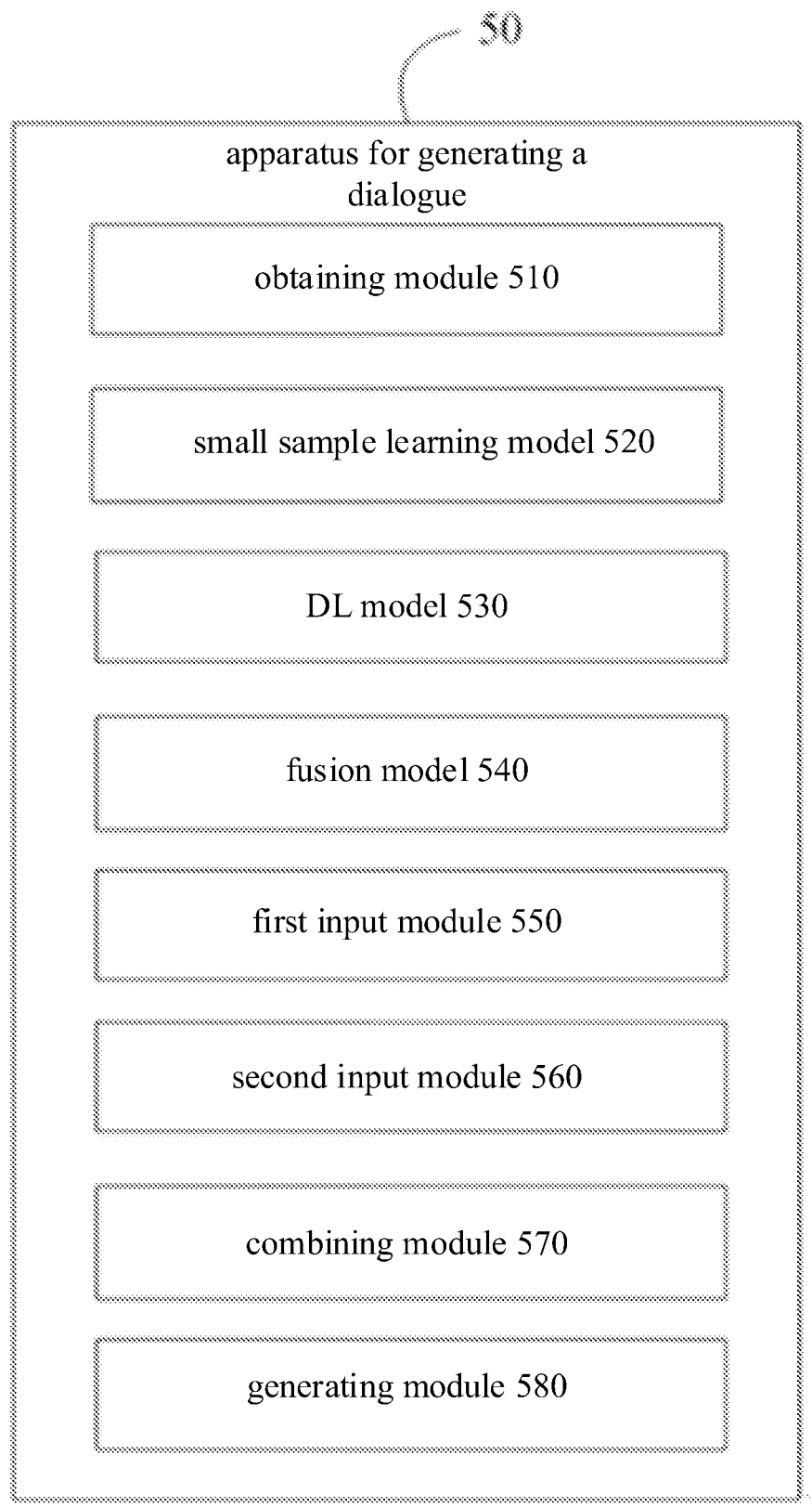
FIG. 8 is a diagram illustrating a structure of an apparatus for generating a dialogue according to a fifth embodiment of the present disclosure.

FIG. 8 is a diagram illustrating a structure of an apparatus for generating a dialogue according to a fifth embodiment of the present disclosure. As illustrated in FIG. 8, the apparatus 50 for generating a dialogue includes an obtaining module 510, a small sample learning model 520, a deep learning model 530, a fusion model 540, a first inputting module 550, a second inputting module 560, a combining module 570 and a generating module 580.

The obtaining module 510 is configured to obtain problem information.

The small sample learning model 520 is configured to generate a first feature of the problem information.

The deep learning (DL) model 530 is configured to generate a second feature of the problem information.

The fusion model 540 is configured to generate dialogue information corresponding to the problem information.

The first input model 550 is configured to input the problem information to the small sample learning model to generate the first feature.

The second input model 560 is configured to input the problem information to a DL model to generate a second feature.

The combining module 570 is configured to combine the first feature and the second feature to generate a feature sequence.

The generating module 580 is configured to input the feature sequence to a fusion model to generate dialogue information corresponding to the problem information.

In a possible implementation of the embodiment of the present disclosure, the first feature includes a problem feature and a support set feature, the small sample learning model 520 is configured to perform a feature extraction on the problem information to generate the problem feature, and a support set corresponding to the problem information is obtained according to the problem feature, and a support set feature of the support set corresponding to the problem information is obtained according to the problem feature.

Further, a plurality of candidate support sets are obtained by the small sample learning model 520, and an intention feature of each candidate support set is obtained, a direct score of the problem feature relative to a plurality of candidate support sets is generated by the small sample learning model according to the problem feature and the intention feature of each candidate support set, and a support set corresponding to the problem information is selected from a plurality of the candidates support sets according to the direct score of the problem feature relative to a plurality of candidate support sets.

The candidate support set includes a plurality of problems, the small sample learning model 520 obtains problem features of a plurality of problems in the candidate support set, and the intention feature of the candidate support set is generated according to the problem features of a plurality of problems.

In a possible implementation of the embodiment of the present disclosure, a contextual feature among a plurality of candidate support sets is generated by the small sample learning model 520 according to the intention feature of each candidate support set, and a comparison score is generated according to the problem feature, the intention feature of each candidate support set and the contextual feature, and a support set corresponding to the problem information is selected from a plurality of candidate support sets according to the direct score and the comparison score.

In a possible implementation of the embodiment of the present disclosure, the small sample learning model 520, the DL model 530 and the fusion model 540 are obtained through joint training.

In a possible implementation of the embodiment of the present disclosure, the second feature includes a low-order feature and a high-order feature, the DL model 530 is configured to perform a feature extraction on the problem information to generate the feature information of the problem feature, and feature embedding processing is performed on the feature information to generate the low-order feature of the problem information, and feature fusion is performed on the low-order feature to generate the high-order feature.

Further, the DL model 530 further receives an external feature vector of the problem information generated by a preset vector representation model; feature fusion is performed on the low-order feature and the external feature vector to generate the high-order feature.

Further, the DL model 530 further receives an external knowledge vector of the problem information, the external knowledge vector is a vector representation corresponding to a target training sample matching the problem information in a preset training sample; the DL model 530 performs feature fusion on the low-order feature, the external knowledge vector and the external feature vector to generate the high-order feature.

In a possible implementation of the embodiment of the present disclosure, the combination module 570 may combine the first feature and the second feature by a plurality of preset fusion operators to generate the feature sequence, in which the feature operator includes a splice operator, an inner product operator and a bilinear feature crossed product.

It needs to be noted that the foregoing explanation of the embodiment of a method for generating a dialogue is also applied to an apparatus for generating a dialogue in this embodiment, of which the implementation principle is similar, which will not be repeated here.

The apparatus for generating a dialogue of the present disclosure, problem information is obtained and the problem information is input to a small sample learning model to generate a first feature, and the problem information is input to a DL model to generate a second feature, and then the first feature and the second feature are combined to generate a feature sequence and the feature sequence is input to a fusion model to generate dialogue information corresponding to problem information, therefore, a small sample learning model, a DL model and a fusion model are combined to generate dialogue information corresponding to the problem so that the model may obtain better effects in the case of fewer samples and more samples, and a small sample learning model and a DL model are selected without necessary to set a threshold, so that the accuracy of problem understanding may not be reduced with the increase of the sample size, and the stability of a model is improved.

An electronic device and a readable storage medium are further provided according to embodiments of the present disclosure.

Figure 9:
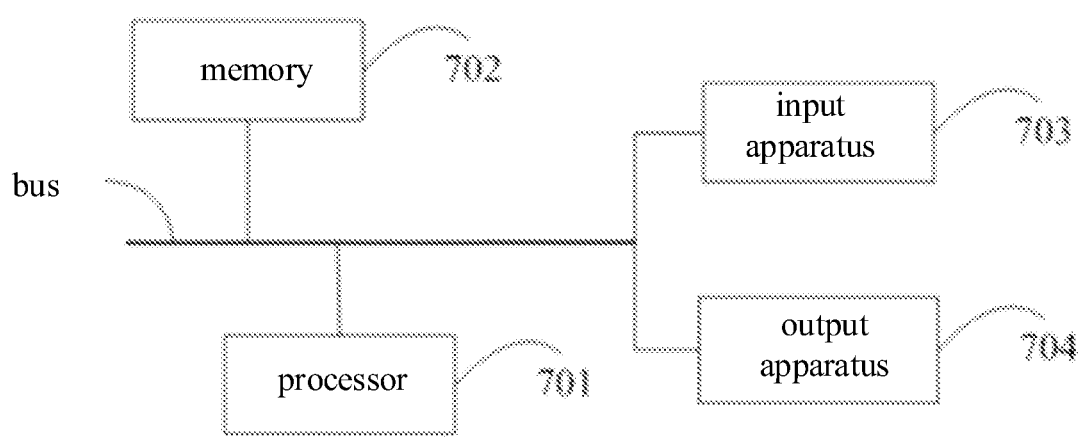
FIG. 9 is a block diagram illustrating an electronic device configured to implement a method for generating a dialogue in embodiments of the present disclosure.

FIG. 9 is a block diagram illustrating an electronic device configured to generate a method for generating a dialogue in embodiments of the present disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As shown in FIG. 9, the electronic device includes: one or more processors 701, a memory 702, and an interface configured to connect various components, including a high-speed interface and a low-speed interface. The various components are connected to each other with different buses, and may be installed on a public main board or installed in other ways as needed. The processor may process instructions executed in the electronic device, including instructions stored in or on the memory to display graphical information of the GUI on an external input/output device (such as a display device coupled to an interface). In other implementation, multiple processors and/or multiple buses may be configured with a plurality of memories if necessary. Similarly, the processor may connect a plurality of electronic devices, and each device provides a part of necessary operations (for example, as a server array, a group of blade servers, or a multi-processor system). FIG. 9 takes one processor 701 as an example.

A memory 702 is a non-transitory computer-readable storage medium provided in the present disclosure. The memory stores instructions executable by the at least one processor, so that the at least one processor executes a method for generating a dialogue as described in the present disclosure. The non-transitory computer-readable storage medium of the present disclosure stores computer instructions, in which the computer instructions are configured so that a method for generating a dialogue provided in the present disclosure.

As a non-transitory computer-readable storage medium, the memory 702 may be configured to store non-transitory software programs, non-transitory computer-executable programs and modules, such as program instructions/modules corresponding to a method for generating a dialogue in the embodiment of the present disclosure (for example, an obtaining module 510, a small sample learning model 520, a deep learning module 530, a fusion model 540, a first inputting module 550, a second inputting module 560, a combining module 570 and a generating module 580 as shown in FIG. 8). The processor 701 executes various functional applications and data processing of the server by running a non-transitory software program, an instruction, and a module stored in the memory 702, that is, a method for generating a dialogue in the above method embodiment is implemented.

The memory 702 may include a program storage area and a data storage area; the program storage area may store operation systems and application programs required by at least one function; the data storage area may store data created based on the use of an electronic device according to the method for generating a dialogue, etc. In addition, the memory 702 may include a high-speed random access memory, and may also include a non-transitory memory, such as at least one magnetic disk storage device, a flash memory device, or other non-transitory solid-state storage devices. In some embodiments, the memory 702 optionally includes a memory set remotely relative to the processor 701 that may be connected to an electronic device executing a method for generating a dialogue via a network. The example of the above networks includes but not limited to an Internet, an enterprise intranet, a local area network, a mobile communication network and their combination.

An electronic device executing a method for generating a dialogue may further include an input apparatus 703 and an output apparatus 704. The processor 701, the memory 702, the input apparatus 703, and the output apparatus 704 may be connected through a bus or in other ways. FIG. 9 takes connection through a bus as an example.

The input apparatus 703 may receive input digital or character information, and generate key signal input related to user setting and function control of an electronic device executing a method for generating a dialogue, such as a touch screen, a keypad, a mouse, a track pad, a touch pad, an indicating rod, one or more mouse buttons, a trackball, a joystick and other input apparatuses. The output apparatus 704 may include a display device, an auxiliary lighting apparatus (for example, a LED) and a tactile feedback apparatus (for example, a vibration motor), etc. The display device may include but not limited to a liquid crystal display (LCD), a light emitting diode (LED) display and a plasma display. In some implementations, a display device may be a touch screen.

Various implementation modes of the systems and technologies described herein may be implemented in a digital electronic circuit system, an integrated circuit system, a dedicated ASIC (application specific integrated circuit), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

The computer programs (also called as programs, softwares, software applications, or codes) include machine instructions of a programmable processor, and may be implemented with high-level procedure and/or object-oriented programming languages, and/or assembly/machine languages. As used herein, the terms "a machine-readable medium" and "a computer-readable medium" refer to any computer program product, device, and/or apparatus configured to provide machine instructions and/or data for a programmable processor (for example, a magnetic disk, an optical disk, a memory, a programmable logic device (PLD)), including a machine-readable medium that receive machine instructions as machine-readable signals. The term "a machine-readable signal" refers to any signal configured to provide machine instructions and/or data for a programmable processor.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), a blockchain network, and an internet.

The computer system may include a client and a server. The client and server are generally far away from each other and generally interact with each other through a communication network. The relation between the client and the server is generated by computer programs that run on the corresponding computer and have a client-server relationship with each other.

According to the technical scheme of the embodiment of the present disclosure, the problem information obtained is respectively input to a small sample learning model and a deep learning (DL) model to generate a first feature and a second feature, and the first feature and the second feature are combined to generate a feature sequence, thus the feature sequence is input to a fusion model to generate dialogue information corresponding to problem information, therefore, a small sample learning model, a DL model and a fusion model are combined to generate dialogue information corresponding to the problem so that the model may obtain better effects in the case of fewer samples and more samples, and a small sample learning model and a DL model are selected without necessary to set a threshold, so that the accuracy of problem understanding may not be reduced with the increase of the sample size, and the stability of a model is improved.

It should be understood that, various forms of procedures shown above may be configured to reorder, add or delete blocks. For example, blocks described in the present disclosure may be executed in parallel, sequentially, or in a different order, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, sub-combinations and substitutions may be made according to design requirements and other factors. Any modification, equivalent replacement, improvement, etc., made within the spirit and principle of embodiments of the present disclosure shall be included within the protection scope of embodiments of the present disclosure.

What is claimed is:

1. A method for generating a dialogue, performed by an electronic device, comprising:
obtaining problem information;
inputting the problem information to a small sample learning model to generate a first feature, wherein the first feature comprises a problem feature and a support set feature, the support set feature comprises a feature of a support set of the small sample learning model, and the support set comprises training data in the small sample learning model;
inputting the problem information to a deep learning (DL) model to generate a second feature, wherein the second feature comprises a low-order feature and a high-order feature, the low-order feature is adjacent to an input layer of the DL model, and the high-order feature is adjacent to a final output layer of the DI model;
combining the first feature and the second feature to generate a feature sequence;
inputting the feature sequence to a fusion model to generate dialogue information corresponding to the problem information; and
providing recommendation information for a user based on the dialogue information;
wherein combining the first feature and the second feature to generate the feature sequence comprises:
combining the first feature and the second feature in different layers by using a plurality of preset fusion operators to generate the feature sequence, wherein the feature operators comprise a splice operator, an inner product operator and a bilinear feature crossed product;
wherein inputting the problem information to the small sample learning model to generate the first feature comprises:
performing a feature extraction on the problem information by the small sample learning model to generate the problem feature; and
obtaining a support set corresponding to the problem information by the small sample learning model according to the problem feature, and obtaining the support set feature of the support set corresponding to the problem information,
wherein, obtaining the support set corresponding to the problem information by the small sample learning model according to the problem feature, comprises:
obtaining a plurality of candidate support sets by the small sample learning model, and obtaining an intention feature of each candidate support set;
generating a direct score of the problem feature relative to the plurality of the candidate support sets by the small sample learning model according to the problem feature and the intention feature of each candidate support set; and
selecting a support set corresponding to the problem information from the plurality of the candidates support sets according to the direct score of the problem feature relative to the plurality of candidate support sets.

2. The method of claim 1, further comprising:
generating contextual features among the plurality of the candidate support sets according to the intention feature of each candidate support set; and
generating a comparison score according to the problem feature, the intention feature of each candidate support set and the contextual feature, and selecting the support set corresponding to the problem information from the plurality of the candidate support sets according to the direct score and the comparison score.

3. The method of claim 1, wherein, the candidate support set comprises a plurality of problems, and the intention feature of the candidate support set is obtained by: obtaining problem features of a plurality of problems in the candidate support set; and generating the intention feature of the candidate support set according to the problem features of the plurality of problems.

4. The method of claim 1, wherein, the small sample learning model, the DL model and the fusion model are obtained through joint training.

5. The method of claim 1, wherein inputting the problem information to the DL model to generate the second feature comprises:

performing a feature extraction on the problem information by the DL model to generate feature information of the problem information; and performing feature embedding processing on the feature information by the DL model to generate the low-order feature of the problem information;

performing feature fusion on the low-order feature by the DL model to generate the high-order feature.

6. The method of claim 5, further comprising: receiving an external feature vector of the problem information by the DL model, wherein the external feature vector is generated by a preset vector representation model, and performing the feature fusion on the low-order feature by the DL model to generate the high-order feature comprises:

performing the feature fusion on the low-order feature and the external feature vector by the DL model to generate the high-order feature.

7. The method of claim 6, further comprising: receiving an external knowledge vector of the problem information by the DL model, wherein the external knowledge vector is a vector representation corresponding to a target training sample matching the problem information in a preset training sample, and performing the feature fusion on the low-order feature by the DL model to generate the high-order feature comprises:

performing the feature fusion on the low-order feature, the external knowledge vector and the external feature vector to generate the high-order feature.

8. An apparatus for generating a dialogue, comprising:
one or more processors;
a memory storing instructions executable by the one or more processors;
wherein the one or more processors are configured to:
obtain problem information;
input the problem information to a small sample learning model to generate a first feature, wherein the first feature comprises a problem feature and a support set feature, the support set feature comprises a feature of a support set of the small sample learning model, and the support set comprises training data in the small sample learning model;
input the problem information to a deep learning (DL) model to generate a second feature, wherein the second feature comprises a low-order feature and a high-order feature, the low-order feature is adjacent to an input layer of the DL model, and the high-order feature is adjacent to a final output layer of the DI model;
combine the first feature and the second feature to generate a feature sequence;
input the feature sequence to a fusion model to generate dialogue information corresponding to the problem information; and
provide recommendation information for a user based on the dialogue information;
wherein the one or more processors are further configured to:
combine the first feature and the second feature in different layers by using a plurality of preset fusion operators to generate the feature sequence, wherein the feature operators comprise a splice operator, an inner product operator and a bilinear feature crossed product;
wherein the one or more processors are configured to:
perform a feature extraction on the problem information to generate the problem feature, and a support set corresponding to the problem information is obtained according to the problem feature; and obtain a support set corresponding to the problem information by the small sample learning model according to the problem feature, and obtain the support set feature of the support set corresponding to the problem information, wherein, the one or more processors are configured to:
obtain a plurality of candidate support sets, and obtain an intention feature of each candidate support set;
generate a direct score of the problem feature relative to the plurality of the candidate support sets according to the problem feature and the intention feature of each candidate support set; and
select a support set corresponding to the problem information from the plurality of the candidates support sets according to the direct score of the problem feature relative to the plurality of candidate support sets.

9. The apparatus of claim 8, wherein the one or more processors are configured to:
generate contextual features among the plurality of the candidate support sets according to the intention feature of each candidate support set; and
generate a comparison score according to the problem feature, the intention feature of each candidate support set and the contextual feature, and selecting the support set corresponding to the problem information from the plurality of the candidate support sets according to the direct score and the comparison score.

10. The apparatus of claim 8, wherein the candidate support set comprises a plurality of problems, and the one or more processors are configured to:
obtain problem features of a plurality of problems in the candidate support set; and
generate the intention feature of the candidate support set according to the problem features of the plurality of problems.

11. The method of claim 8, wherein, the small sample learning model, the DL model and the fusion model are obtained through joint training.

12. The apparatus of claim 8, wherein the one or more processors are configured to:
perform a feature extraction on the problem information by the DL model to generate feature information of the problem information; and
perform feature embedding processing on the feature information by the DL model to generate the low-order feature of the problem information;
perform feature fusion on the low-order feature by the DL model to generate the high-order feature.

13. The apparatus of claim 12, wherein, the one or more processors are configured to: receive an external feature vector of the problem information, wherein the external feature vector is generated by a preset vector representation model; and perform the feature fusion on the low-order feature and the external feature vector to generate the high-order feature.

14. The apparatus of claim 13, wherein, the one or more processors are configured to: receive an external knowledge vector of the problem information, the external knowledge vector is a vector representation corresponding to a target training sample matching the problem information in a preset training sample, and to perform the feature fusion on the low-order feature, the external knowledge vector and the external feature vector to generate the high-order feature.

15. A non-transitory computer-readable storage medium storing computer instructions, wherein the computer instructions are configured to cause a computer to execute a method for generating a dialogue, and the method comprises:

obtaining problem information;

inputting the problem information to a small sample learning model to generate a first feature, wherein the first feature comprises a problem feature and a support set feature, the support set feature comprises a feature of a support set of the small sample learning model, and the support set comprises training data in the small sample learning model;

inputting the problem information to a deep learning (DL) model to generate a second feature, wherein the second feature comprises a low-order feature and a high-order feature, the low-order feature is adjacent to an input layer of the DL model, and the high-order feature is adjacent to a final output layer of the DI model;

combining the first feature and the second feature to generate a feature sequence;

inputting the feature sequence to a fusion model to generate dialogue information corresponding to the problem information; and providing recommendation information for a user based on the dialogue information;

wherein combining the first feature and the second feature to generate the feature sequence comprises:

combining the first feature and the second feature in different layers by using a plurality of preset fusion operators to generate the feature sequence, wherein the feature operators comprise a splice operator, an inner product operator and a bilinear feature crossed product;

wherein inputting the problem information to the small sample learning model to generate the first feature comprises:

performing a feature extraction on the problem information by the small sample learning model to generate the problem feature; and obtaining a support set corresponding to the problem information by the small sample learning model according to the problem feature, and obtaining the support set feature of the support set corresponding to the problem information, wherein, obtaining the support set corresponding to the problem information by the small sample learning model according to the problem feature, comprises:

obtaining a plurality of candidate support sets by the small sample learning model, and obtaining an intention feature of each candidate support set;

generating a direct score of the problem feature relative to the plurality of the candidate support sets by the small sample learning model according to the problem feature and the intention feature of each candidate support set; and selecting a support set corresponding to the problem information from the plurality of the candidates support sets according to the direct score of the problem feature relative to the plurality of candidate support sets.

* * * * *